United States Patent
Goel et al.

(10) Patent No.: US 11,699,010 B2
(45) Date of Patent: Jul. 11, 2023

(54) METHOD AND SYSTEM FOR REDUCING MIGRATION ERRORS

(71) Applicants: TAIWAN SEMICONDUCTOR MANUFACTURING COMPANY, LTD., Hsinchu (TW); TSMC NANJING COMPANY, LIMITED, Jiangsu (CN)

(72) Inventors: Sandeep Kumar Goel, Hsinchu (TW); Ankita Patidar, Hsinchu (TW); Yun-Han Lee, Hsinchu (TW)

(73) Assignees: TAIWAN SEMICONDUCTOR MANUFACTURING COMPANY, LTD., Hsinchu (TW); TSMC NANJING COMPANY, LIMITED, Nanjing (CN)

( * ) Notice: Subject to any disclaimer, the term of this patent is extended or adjusted under 35 U.S.C. 154(b) by 0 days.

(21) Appl. No.: 17/365,468

(22) Filed: Jul. 1, 2021

(65) Prior Publication Data
US 2021/0326502 A1 Oct. 21, 2021

Related U.S. Application Data

(63) Continuation of application No. 16/788,949, filed on Feb. 12, 2020, now Pat. No. 11,055,455.

(30) Foreign Application Priority Data

Dec. 19, 2019 (CN) .......................... 201911315931.X

(51) Int. Cl.
*G06F 30/323* (2020.01)
*G06F 30/3323* (2020.01)
(Continued)

(52) U.S. Cl.
CPC .............. *G06F 30/323* (2020.01); *G03F 1/70* (2013.01); *G06F 30/3323* (2020.01);
(Continued)

(58) Field of Classification Search
USPC .......................................................... 716/103
See application file for complete search history.

(56) References Cited

U.S. PATENT DOCUMENTS

| 7,260,442 B2 | 8/2007 | Hwang et al. |
| 7,774,735 B1 | 8/2010 | Sood |

(Continued)

FOREIGN PATENT DOCUMENTS

CN 107423463 12/2017

OTHER PUBLICATIONS

Office Action dated Nov. 11, 2021 for corresponding case No. TW 11021110140. (pp. 1-3).

*Primary Examiner* — Bryce M Aisaka
(74) *Attorney, Agent, or Firm* — Hauptman Ham, LLP

(57) ABSTRACT

A method of manufacturing a semiconductor device includes reducing errors in a migration of a first netlist to a second netlist, the first netlist corresponding to a first semiconductor process technology (SPT), the second first netlist corresponding to a second SPT, the first and second netlists each representing a same circuit design, the reducing errors including: inspecting a timing constraint list corresponding to the second netlist for addition candidates; generating a first version of the second netlist having a first number of comparison points relative to a logic equivalence check (LEC) context, the first number of comparison points being based on the addition candidates; performing a LEC between the first netlist and the first version of the second netlist, thereby identifying migration errors; and revising the second netlist to reduce the migration errors, thereby resulting in a second version of the second netlist.

20 Claims, 11 Drawing Sheets

(51) Int. Cl.
  *G06F 30/392* (2020.01)
  *G06F 30/394* (2020.01)
  *G03F 1/70* (2012.01)
  *G06F 119/12* (2020.01)

(52) U.S. Cl.
  CPC .......... *G06F 30/392* (2020.01); *G06F 30/394* (2020.01); *G06F 2119/12* (2020.01)

(56) References Cited

U.S. PATENT DOCUMENTS

| | | |
|---|---|---|
| 8,423,941 B2 | 4/2013 | Heng et al. |
| 8,627,247 B1 | 1/2014 | McCullen et al. |
| 8,631,365 B2 | 1/2014 | Kengeri et al. |
| 8,745,554 B2 | 6/2014 | Cheng et al. |
| 8,826,195 B2 | 9/2014 | Lee et al. |
| 9,256,709 B2 | 2/2016 | Yu et al. |
| 9,275,186 B2 | 3/2016 | Lu et al. |
| 9,576,094 B2 | 2/2017 | Chuang et al. |
| 9,659,132 B2 | 5/2017 | Kerre et al. |
| 9,672,315 B2 | 6/2017 | Lu et al. |
| 2008/0134109 A1* | 6/2008 | Hammouda ............ G06F 30/36 716/113 |
| 2014/0040838 A1 | 2/2014 | Liu et al. |
| 2015/0278429 A1 | 10/2015 | Chang |
| 2019/0303527 A1 | 10/2019 | Tien et al. |

* cited by examiner

METHOD AND SYSTEM FOR REDUCING MIGRATION ERRORS

PRIORITY CLAIM

The present application is a continuation of U.S. patent application Ser. No. 16/788,949, filed Feb. 12, 2020, which claims priority to the China Patent Application No. 201911315931.X, filed Dec. 19, 2019, which are incorporated herein by reference in their entireties.

BACKGROUND

Regarding semiconductor devices, with the progression from a first (typically, older) semiconductor process technology (SPT) node to a second (typically, newer) SPT node, it is common to shrink (or scale or migrate) a circuit design from a first implementation under the first SPT node to a corresponding second implementation under the second SPT node. Typically, advantages of circuit design migration include, e.g., reduced device sizes, increased device operational speeds, reduced device costs, extension of the device's life cycle, or the like.

Typically, there are differences between a second set of design rules under the second SPT node and a first set of design rules under the first SPT node. Accordingly, a significant number of violations of the second set of design rules arise during the migration of a circuit design. Determination of the second implementation under the second SPT node is an iterative process. With each iteration, errors in the second implementation, e.g., violations of the second set of design rules, are reduced.

BRIEF DESCRIPTION OF THE DRAWINGS

One or more embodiments are illustrated by way of example, and not by limitation, in the figures of the accompanying drawings, wherein elements having the same reference numeral designations represent like elements throughout. The drawings are not to scale, unless otherwise disclosed.

DETAILED DESCRIPTION

Figure 1:
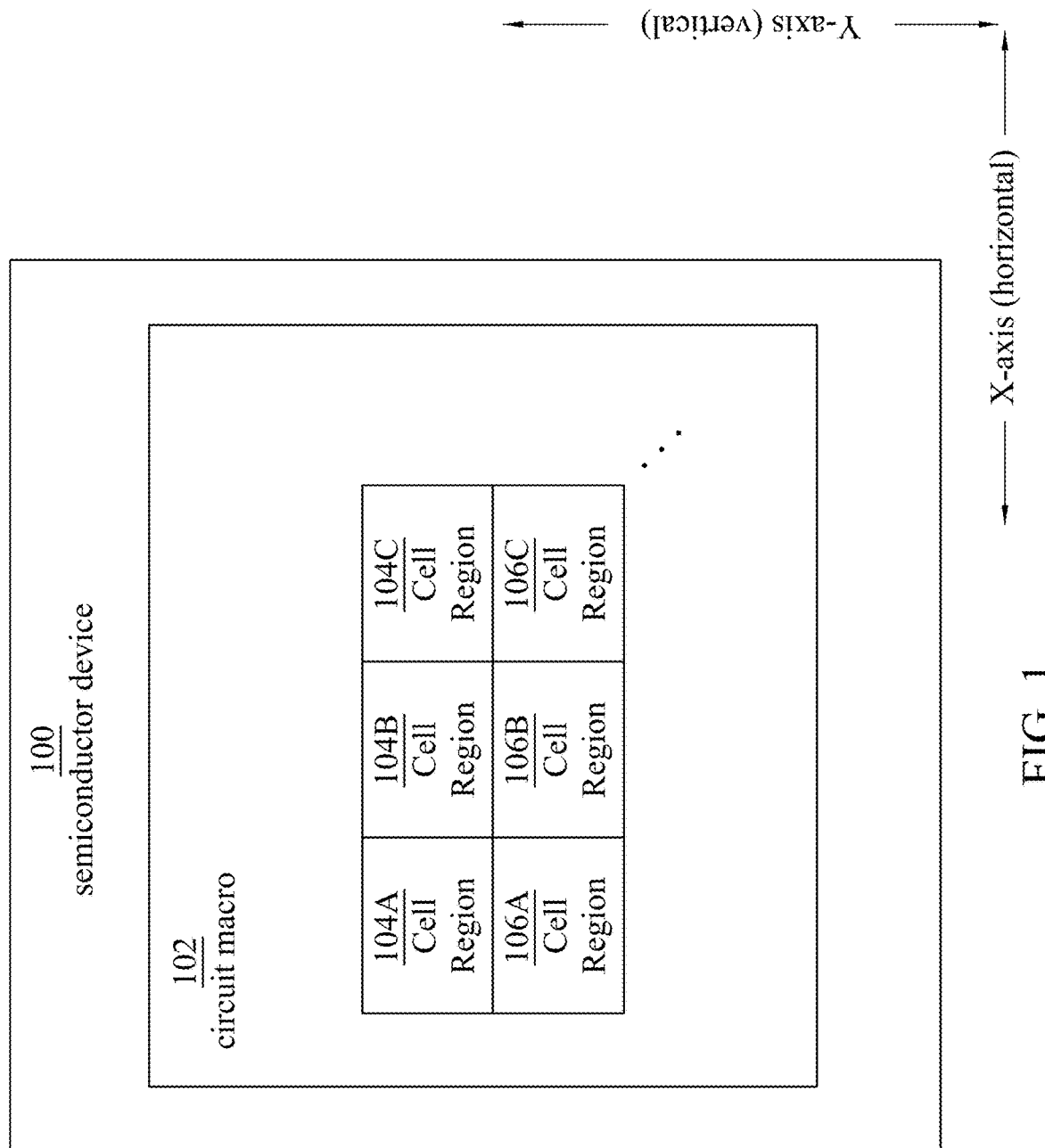
FIG. 1 is a block diagram of a semiconductor device, in accordance with at least one embodiment of the present disclosure.

The following disclosure provides many different embodiments, or examples, for implementing different features of the provided subject matter. Specific examples of components, materials, values, steps, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In some embodiments, migration errors are reduced (if not eliminated) in a migration from a first implementation of a circuit design under a first semiconductor process technology (SPT) node to a second implementation under a second SPT node of the circuit design. A method of reducing the migration errors includes: inspecting a timing constraint list for addition candidates, the timing constraint list corresponding to an initial netlist which represents the second implementation; relative to a logic equivalence check (LEC) context, increasing a number of comparison points based on the addition candidates, resulting in the first version of the second netlist; performing a LEC between the first netlist and the first version of the second netlist, thereby identifying migration errors; and revising the first version of the second netlist to reduce the migration errors, thereby resulting in a second version of the second netlist.

A benefit of adding to the number of comparison points (according to at least some embodiments) is that migration errors are reduced, if not eliminated, before performing placement & routing (P&R) and/or before performing static timing analysis (STA), which improves the P&R and/or the STA, e.g., in terms of speed, efficiency, or the like. According to another approach, migration does not include checking for migration errors before P&R and/or before the STA. According to the other approach, a check for timing violations following the STA yields timing violations related to the P&R step, but also timing violations related to migration errors. In developing at least some of the present embodiments, it was recognized that the P&R and the STA are performed prematurely according to the other approach because migration errors could have been reduced (if not eliminated) without having had to perform the P&R and the STA.

FIG. 1 is a block diagram of a semiconductor device 100, in accordance with at least one embodiment of the present disclosure.

In FIG. 1, semiconductor device 100 includes, among other things, a circuit macro (hereinafter, macro) 102. In some embodiments, macro 102 is an SRAM macro. In some embodiments, macro 102 is a macro other than an SRAM macro. Macro 102 includes, among other things, cell regions 104A, 104B, 104C, et seq., and cell regions 106A, 106B, 106C, et seq.

Macro 102 is an implementation (fabrication) of a circuit design according to (under) a semiconductor process technology (SPT) node. In some embodiments, macro 102 is implemented (fabricated) based on a layout diagram which represents the circuit design, the layout diagram itself having been generated under the semiconductor process technology node. In some embodiments, the layout diagram is based on a netlist which represents the circuit design, the netlist itself having been generated under the semiconductor process technology node. According to some embodiments, in a context of migrating a circuit design from a first SPT node (Node A) to a second SPT node (Node B), there are provided methods of reducing migration errors by revising an initial netlist under Node B and thereby generating a revised netlist under Node B. In some embodiments, a layout diagram is generated based on the revised netlist.

Figure 2:
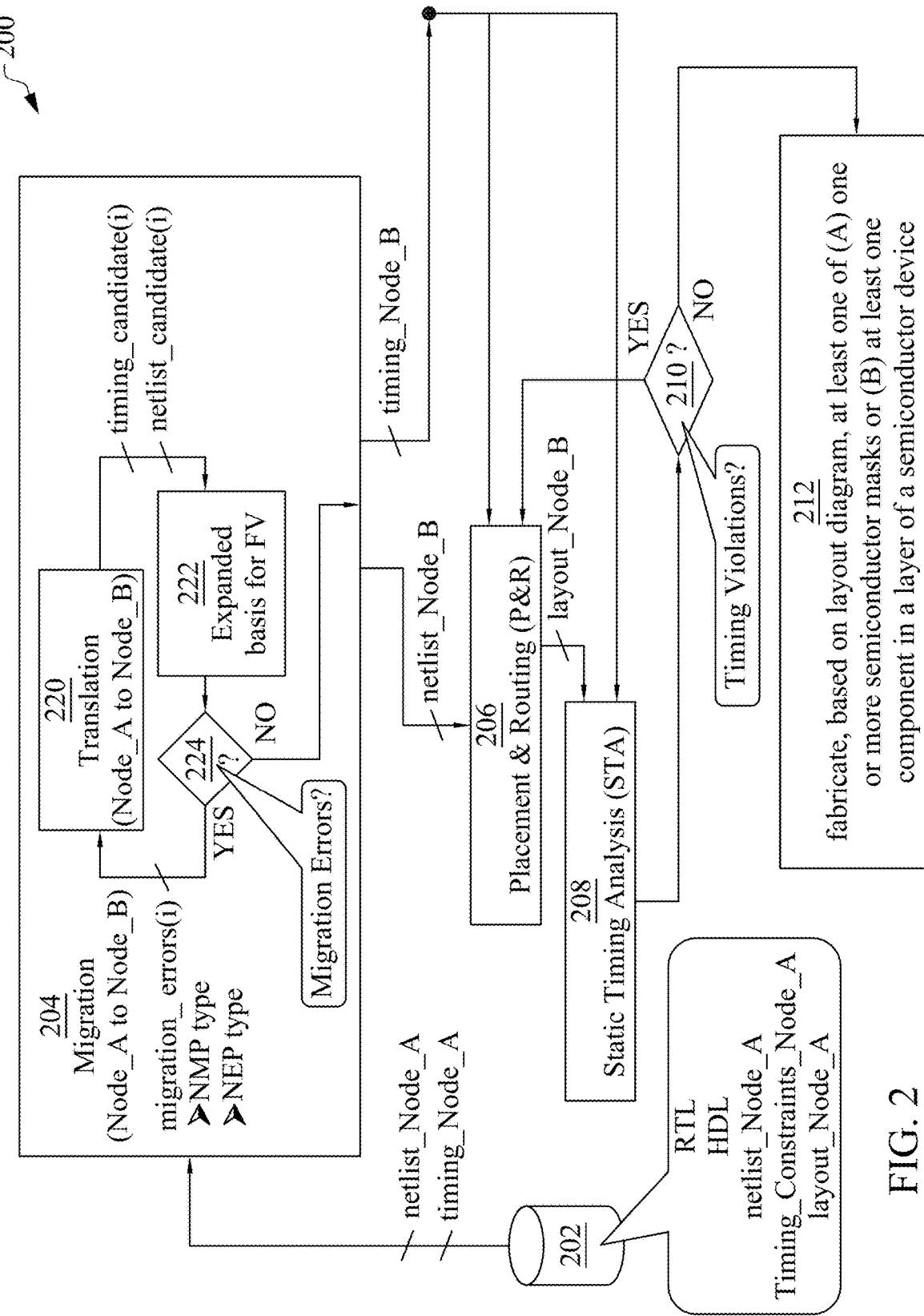
FIG. 2 is a flow diagram of a circuit design migration, in accordance with at least one embodiment of the present disclosure.

FIG. 2 is a flow diagram 200 of a circuit design migration, in accordance with at least one embodiment of the present disclosure.

In FIG. 2, it is assumed that a circuit design is being migrated from a first implementation under a first semiconductor process technology (SPT) node (Node A) to a second implementation under a second SPT node (Node B). In some embodiments, a smallest transistor size which can be fabricated under the second SPT node (node B) is smaller than a smallest transistor size which can be fabricated under the first SPT node (Node A). Nevertheless, in some embodiments, a smallest transistor size which can be fabricated under the first SPT node (Node A) is smaller than a smallest transistor size which can be fabricated under the second SPT node (Node B).

In FIG. 2, at least the following are stored in memory 202: a final version of a register-transfer level (RTL) abstraction of the circuit design; a final version of the RTL abstraction in a hardware description language (HDL) (final HDL version), e.g., Verilog, VHDL, or the like; and a final version of a netlist (predecessor netlist) under the first SPT node (Node A) which represents the first implementation. In some embodiments, the predecessor netlist is referred to as a golden netlist. In FIG. 2, the predecessor netlist is also referred to as netlist_Node_A. In some embodiments, the predecessor netlist is a cell-level netlist comprised of standard cells and other features which can be fabricated under the first node (Node A). In some embodiments, the predecessor netlist is a gate-level netlist. In some embodiments, the predecessor netlist is a transistor-level netlist. In some embodiments, the predecessor netlist represents the first implementation in a manner other than that of, a cell-level netlist a gate-level netlist or a transistor-level netlist.

In some embodiments, memory 202 further includes: a timing constraint list (timing_Node_A) corresponding to the predecessor netlist. In some embodiments, memory 202 further includes: a layout diagram (layout_Node_A) corresponding to the predecessor netlist. In some embodiments, memory 202 is a non-transitory computer-readable medium.

Flow diagram 200 includes blocks 204-212. At block 204, the predecessor netlist (netlist_Node_A) is received from memory 202. Block 204 (discussed in more detail below) migrates the circuit design, as represented by the predecessor netlist (netlist_Node_A), to the second implementation under the second SPT node (Node B), where the second implementation is represented by a revised netlist (netlist_Node_B) provided at an output of block 204. Block 204 also generates a timing constraint list (timing_Node_B) corresponding to the revised netlist (netlist_Node_B), which is provided at a second output of block 204 to each of blocks 206 and 208. From block 204, flow proceeds to block 206.

At block 206, in view of the timing constraint list (timing_Node_B), the revised netlist is subjected to placement & routing (P&R), resulting in a layout diagram (layout_Node_B). From block 206, flow proceeds to block 208. At block 208, in view of the timing constraint list, the layout diagram is subjected to static timing analysis (STA). From block 208, flow proceeds to block 210. At block 210, it is determined if one or more timing violations are indicated by STA of block 208. If one or more timing violations are indicated, then flow loops back to block 206 at which changes are made to the layout diagram in order to reduce the timing violations. In some embodiments, if no violations are indicated at block 210, then flow proceeds to block 212. At block 212, based on the layout diagram, at least one of (A) one or more semiconductor masks or (B) at least one component in a layer of a semiconductor device are fabricated. An example of such a semiconductor device is semiconductor device 100 of FIG. 1.

Returning to block 204, block 204 includes blocks 220, 222 and 224, which comprise a loop which is iterated. Each $i^{th}$ iteration through the loop generates an $i^{th}$ netlist candidate (netlist_candidate(i)) for the revised netlist, and a corresponding $i^{th}$ timing candidate (timing_candidate(i)) for the timing constraint list, where i is a non-negative integer.

In a first iteration through the loop, where i=0, at block 220, the predecessor netlist (netlist_Node_A) is translated into an initial netlist (netlist_candidate(0)) representing the first candidate for the revised netlist, and an initial timing constraint list (timing_candidate(0)) is generated. At block 220, the translation replaces the standard cells and other features of the predecessor netlist (netlist_Node_A) with corresponding standard cells and other features which can be fabricated under the second node (node B).

In some embodiments, the translation replaces a given standard cell or other feature in the predecessor netlist (netlist_Node_A) with a corresponding standard cell or other feature which: can be fabricated under the second node (node B); has the same external architecture; and has the same internal architecture. In some embodiments, the translation replaces a given standard cell or other feature in the predecessor netlist (netlist_Node_A) with a corresponding standard cell or other feature which: can be fabricated under the second node (node B); has the same external architecture; and has a different internal architecture. In some embodiments, having the same external architecture refers to having the same input pin(s), the same output pin(s) and the same black box functionality. In some embodiments, having the same internal architecture refers to having the same internal components and internal interconnections thereof albeit of different sizes according to the corresponding SPT node. In some embodiments, having the same internal architecture refers to having the same internal components and internal interconnections thereof albeit of different sizes and at least some different materials according to the corresponding SPT node. In some embodiments, black box functionality (or functionality of a black box) refers to a transfer function which represents the operational relationship between signals on the input pin(s) and signals on the output pin(s) of a black box albeit without an understanding of the components and corresponding interconnections which comprise the black box. A contrasting term is glass box functionality (or functionality of a glass box), which refers to a transfer function which represents the operational relationship between signals on the input pin(s) and signals on the output pin(s) of a glass box albeit with an understanding of the components and corresponding interconnections which comprise the black box.

Details pertinent to the translation of block 220 are found, e.g., in U.S. Pat. No. 9,672,315, granted Jun. 6, 2017, U.S. Pat. No. 9,659,132, granted May 23, 2017, U.S. Pat. No. 9,576,094, granted Feb. 21, 2017, U.S. Pat. No. 9,275,186, granted Mar. 2, 2016, U.S. Pat. No. 8,826,195, granted Sep. 2, 2014, U.S. Pat. No. 8,745,554, granted Jun. 3, 2014, U.S. Pat. No. 8,631,365, granted Jan. 14, 2014, U.S. Pat. No. 8,627,247, granted Jan. 7, 2014, U.S. Pat. No. 8,423,941, granted Apr. 16, 2013, and U.S. Pat. No. 7,774,735, granted Aug. 10, 2010, the entireties of each of which are hereby incorporated by reference.

From block 220, flow proceeds to block 222. At block 222, a basis for formal verification (FV) is expanded (see FIGS. 3, 4A-4E and 5), which thereby facilitates making an expanded FV. In some embodiments, as discussed below in more detail (see FIGS. 3, 4A-4E and 5), the types of migration errors for which the expanded FV checks include at least one of a not-matched pin (NMP) error or a non-equivalent pin (NEP) error.

From block 222, flow proceeds to a block 224, where the FV is performed relative to the expanded basis (the basis having been expanded in block 222), such that block 224 is a decision block at which it is determined if there are any migration errors in the $i^{th}$ netlist candidate (netlist_candidate (i)) (see FIGS. 3, 4A-4E and 5). If the outcome of decision block 224 is yes (meaning that there are one or more migration errors), then flow loops back to block 220 at which changes are made to the $i^{th}$ netlist candidate (netlist_candidate(i)) in order to reduce the migrations errors, which results in an $(i+1)^{th}$ candidate (netlist_candidate(i+1)), and a corresponding timing candidate (timing_candidate(i+1)) is generated. If the outcome of decision block 224 is no (meaning that there are no migration errors), then: the $i^{th}$ netlist candidate (netlist_candidate(i)) is deemed to be the revised netlist (netlist_Node_B); the corresponding $i^{th}$ timing candidate (timing_candidate(i)) is deemed to be the corresponding timing constraint list (timing_Node_B); and flow proceeds out of block 204 to block 206 (discussed above).

A benefit of including the expanded FV is that migration errors are reduced, if not eliminated, before reaching the P&R of block 206 and the STA of block 208, which improves the P&R of block 206 and the STA of block 208, e.g., in terms of speed, efficiency, or the like. According to another approach, a migration step includes only a translation step (corresponding to block 220) without including the expanded FV (corresponding to blocks 222-224), where the migration step is followed by sequence of a P&R step (corresponding to block 206) and a STA step (corresponding to block 208). According to the other approach, a check for timing violations following the STA step yields timing violations related to the P&R step, but also timing violations related to migration errors. In developing at least some of the present embodiments, it was recognized that the P&R step and the STA step are performed prematurely according to the other approach because migration errors could have been reduced (if not eliminated) without having had to perform the P&R step and the STA step.

Figure 3:
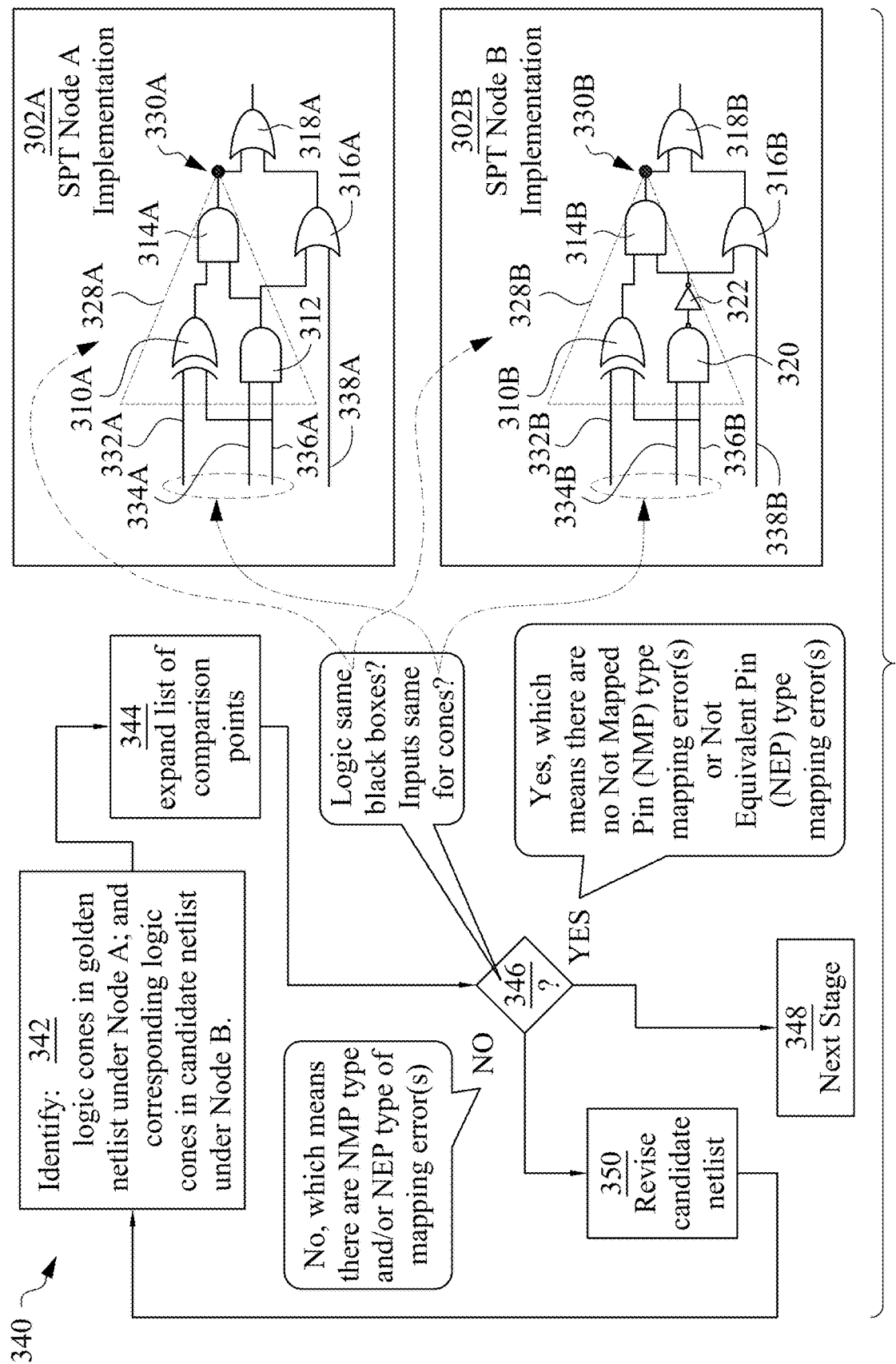
FIG. 3 is a flowchart of a mapped pin checking method, in accordance with at least one embodiment of the present disclosure.

FIG. 3 is a flowchart of a migration error checking method 340, in accordance with at least one embodiment of the present disclosure.

Method 340 represents an example of the migration error checking performed at block 224 of FIG. 2.

Method 340 includes blocks 342-350. FIG. 3 follows the same assumptions as in FIG. 2 (discussed above) such that FIG. 3 assumes: that a circuit design is being migrated from a first implementation under the first SPT node (Node A) to a second implementation under the second SPT node (Node B); and that the first implementation is represented by the predecessor netlist, and the second implementation is represented by the $i^{th}$ candidate for the revised netlist.

In some embodiments, in order to assess the accuracy with which pins in the predecessor netlist are mapped to corresponding pins in the revised netlist, an EDA system (see FIG. 6) dissects each netlist into smaller pieces, and then analyzes the extent to which the pieces of the predecessor netlist correspond to the pieces of the revised netlist. In some embodiments, the pieces are referred to as logic cones, the pieces (logic cones) are connected to each other at comparison points, and each of the predecessor netlist and the revised netlist are represented as corresponding collections comprised of logic cones and comparison points.

In some embodiments, examples of comparison points include an input to an instance of sequential logic within a circuit, a primary output of a circuit, an input to a black box within a circuit, or the like. In some embodiments, a logic cone is an instance of combinational logic. In some embodiments, a logic cone includes an arrangement of combinational gates. In some embodiments, a larger logic cone includes smaller logic cones. In some embodiments, examples of inputs to a logic cone include an output of an instance of sequential logic, a primary input, an output of a black box, or the like.

At block 342 of method 340, logic cones in the predecessor netlist (golden netlist) under the first semiconductor process technology (SPT) node (Node A) and corresponding logic cones in the $i^{th}$ candidate for the revised netlist are identified. From block 342, flow proceeds to block 344.

At block 344, a list of comparison points corresponding to the candidate netlist under the second SPT node (Node B) is expanded by converting selected glass boxes to corresponding black boxes (see FIGS. 4A-4E and 5). In some embodiments, converting selected glass boxes to corresponding black boxes is referred to as black-boxing the selected glass boxes. From block 344, flow proceed to block 346, which is a decision block.

At block 346, based on the expanded list of comparison points, it is determined whether the logic cones under the first SPT node (Node A) have the same inputs and the same black box functionality as the corresponding logic cones under the second SPT node (Node B). In some embodiments, for all possible combinations of input values (comparison points) for each logic cone under the first SPT node (Node A) and the corresponding logic cone of $i^{th}$ candidate for the revised netlist relative, the EDA system determines if values at the output of the logic cone (comparison point)

under the first SPT node (Node A) are the same as the values at the output of the corresponding logic cone of $i^{th}$ candidate; if so, then the EDA system deems the black box functionality to be the same.

If the outcome of decision block 346 is yes, then flow proceeds to block 348, which represents a next stage in the design flow. An example of block 348 is P & R block 206 of FIG. 2. The positive (yes) outcome of decision block 346 means that corresponding black box functionalities have been determined to be the same such that no not-mapped-pin (NMP) type mapping errors or no not-equivalent-pin (NEP) type errors mapping errors are present.

If the outcome of decision block 346 is no (meaning that one or more corresponding black box functionalities have been determined to not be the same), then flow proceeds to block 350. The negative (no) outcome of decision block 346 means that one or more NMP type mapping errors and/or one or more NEP type errors are present. At block 350, the candidate netlist is revised in order to reduce the mapping errors. In some embodiments, flow loops back from block 350 to block 342.

As examples by which to illustrate aspects of method 340, FIG. 3 shows: a first portion (for simplicity) of an example predecessor netlist, the first portion being represented as logic block diagram 302A; and a second portion (for simplicity) of an example $i^{th}$ candidate, the second portion being represented as logic block diagram 302B.

Portion 302A includes: a logic cone 328A; an OR gate 316A and an OR gate 318A. The output of OR gate 318A represents the output of portion 302A. The output of logic cone 328A is coupled to a first input of OR gate 318A. The output of OR gate 316A is coupled to a second input of OR gate 318A.

Portion 302B includes: a logic cone 328B; an OR gate 316B and OR gate 318B. The output of OR gate 318B represents the output of portion 302B. The output of logic cone 328B is coupled to a first input of OR gate 318B. The output of OR gate 316B is coupled to a second input of OR gate 318B.

Logic cone 328A includes an exclusive OR (XOR) gate 310A, an AND gate 312 and an AND gate 314A. An output of XOR gate 310A and an output of AND gate 312 are connected to corresponding first and second inputs of AND gate 314A. An output of AND gate 314A at node 330A represents an output of logic cone 328A. Inputs of logic cone 328A include an input line 332A which is connected to a first input of XOR gate 310A, an input line 336A which is connected to each of a second input of XOR gate 310A and a first input of AND gate 312, and an input line 334A which is connected to a second input of AND gate 312.

Logic cone 328B includes exclusive XOR gate 310B, a NAND gate 320, an inverter 322 and AND gate 314B. An output of NAND gate 320 is connected to an input of inverter 322. The output of XOR gate 310B and an output of inverter 322 are connected to corresponding first and second inputs of AND gate 314B. An output of AND gate 314B at node 330B represents an output of logic cone 328B. Inputs of logic cone 328B include input line 332B which is connected to the first input of XOR gate 310B, input line 336B which is connected to each of the second input of XOR gate 310B and a first input of NAND gate 320, and input line 334 which is connected to a second input of NAND gate 320.

In the context of the example, logic cone 328B has a different internal architecture than logic cone 328A because NAND gate 320 and inverter 322 of logic cone 328B have been substituted for AND gate 312 of logic cone 328A.

Nevertheless, logic cone 328B has the same black box functionality as logic cone 328A.

Returning to block 344, albeit in the context of the example, if AND gate 312 of logic cone 328A appeared in the golden timing diagram, and correspondingly NAND gate 320 of logic cone 328B appeared in the corresponding candidate timing constraint, the list of comparison points is expanded by 'black-boxing' AND gate 312 and corresponding NAND gate 320, where such expansion could reveal a potential NEP. From block 344, flow proceeds to block 346. At block 346, it is determined whether the inputs of the logic cone under the first SPT node (Node A) are the same as the inputs of the corresponding logic cone under the second SPT node (Node B), and whether the inputs of now black box 312 under the first SPT node (Node A) are the same as the inputs of now black-box 320 under the second SPT node (Node B).

If the inputs are determined to not be the same at block 346, then one or more NMP type mapping errors and/or one or more NEP type errors are present, and so then flow proceeds to block 350. At block 350, the candidate netlist is revised in order to reduce the NMP error(s).

If the inputs are determined to be the same at block 346, then flow proceeds to loop back to block 348.

Figure 4A:
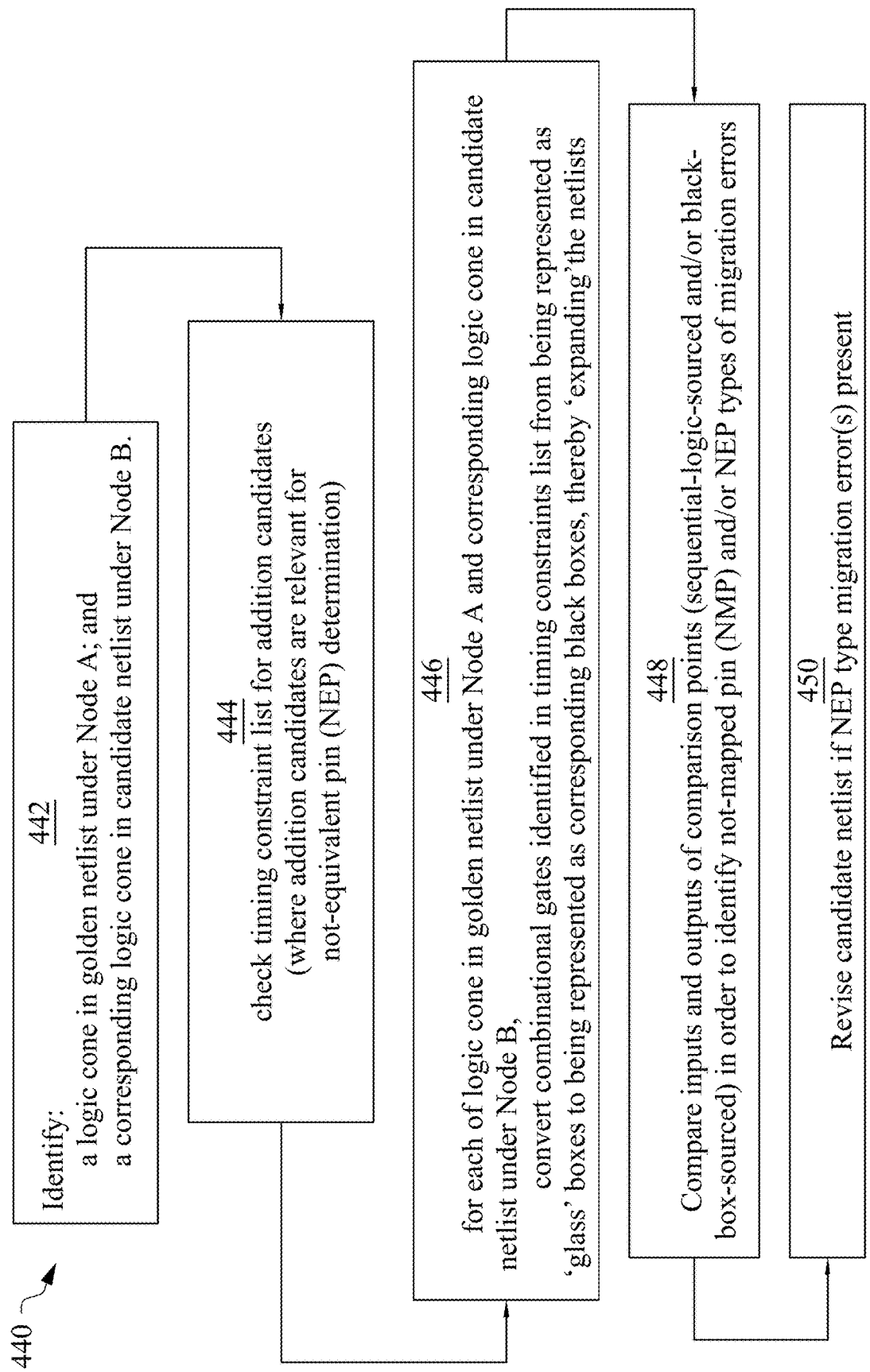
FIG. 4A is a flowchart of a pin equivalence checking method, in accordance with at least one embodiment of the present disclosure.

FIG. 4A is a flowchart of a pin equivalence checking method 440, in accordance with at least one embodiment of the present disclosure.

Method 440 represents an example of a part of the expanded FV performed at bock 222 of FIG. 1, wherein the part relates to verifying that corresponding pins are equivalent. Examples by which to illustrate aspects of method 440 are shown in corresponding FIGS. 4B-4F.

Figure 4B:
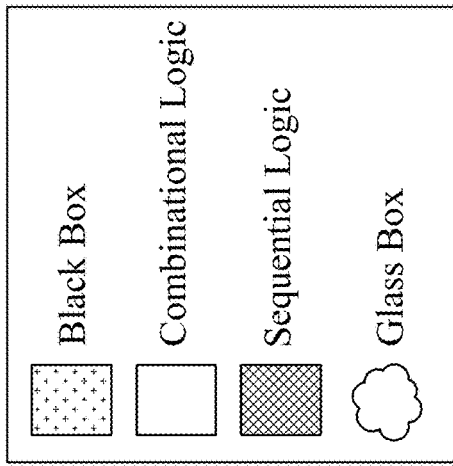
FIGS. 4B and 4C are logic block diagrams before black box addition of corresponding logic cones under corresponding first and second SPT nodes, in accordance with at least one embodiment of the present disclosure.
Figure 4B:
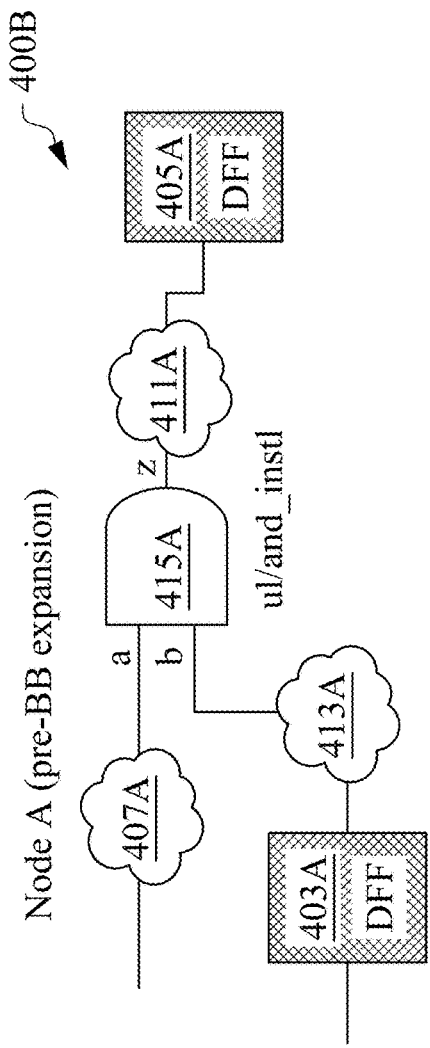
Figure 4C:
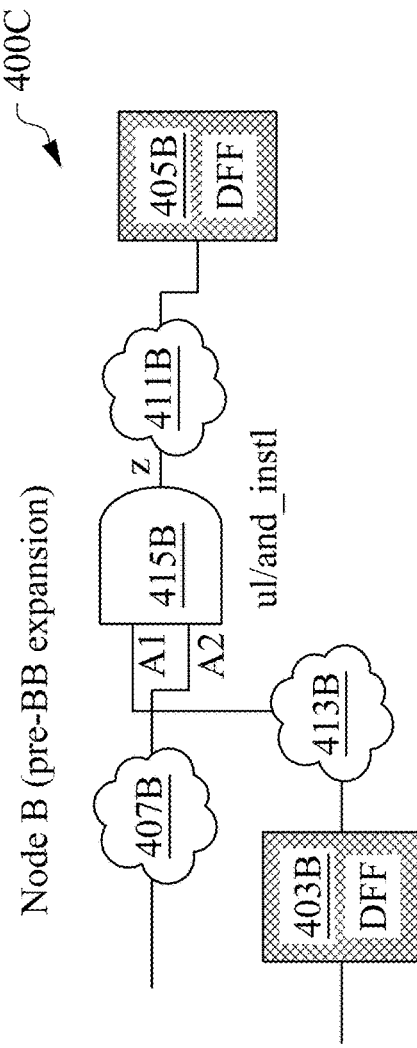

FIGS. 4B and 4C are logic block diagrams before black box addition of corresponding logic cones 400B and 400C under corresponding first and second SPT nodes, in accordance with at least one embodiment of the present disclosure.

Figure 4D:
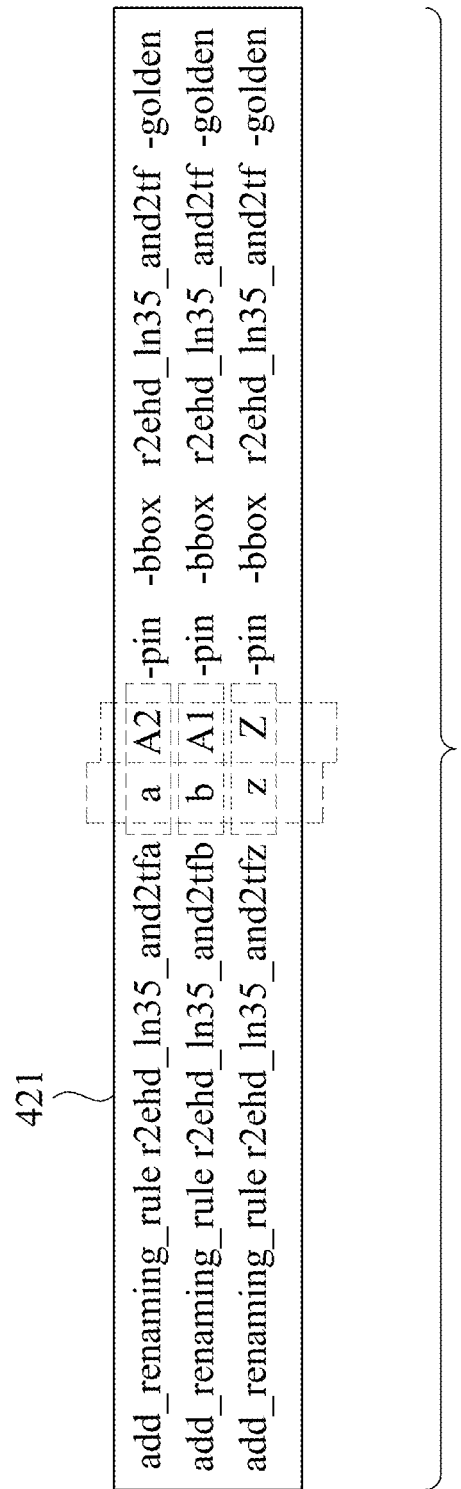
FIG. 4D is a table of example renaming rules, in accordance with at least one embodiment of the present disclosure.

FIG. 4D is a table 421 of example renaming rules, in accordance with at least one embodiment of the present disclosure.

Figure 4E:
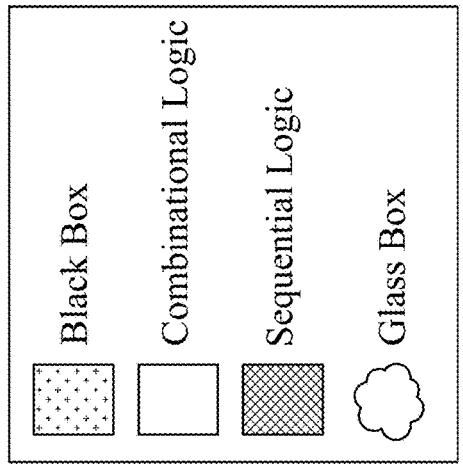
FIGS. 4E and 4F are logic block diagrams after black box addition of corresponding logic cones under corresponding first and second SPT nodes, in accordance with at least one embodiment of the present disclosure.
Figure 4E:
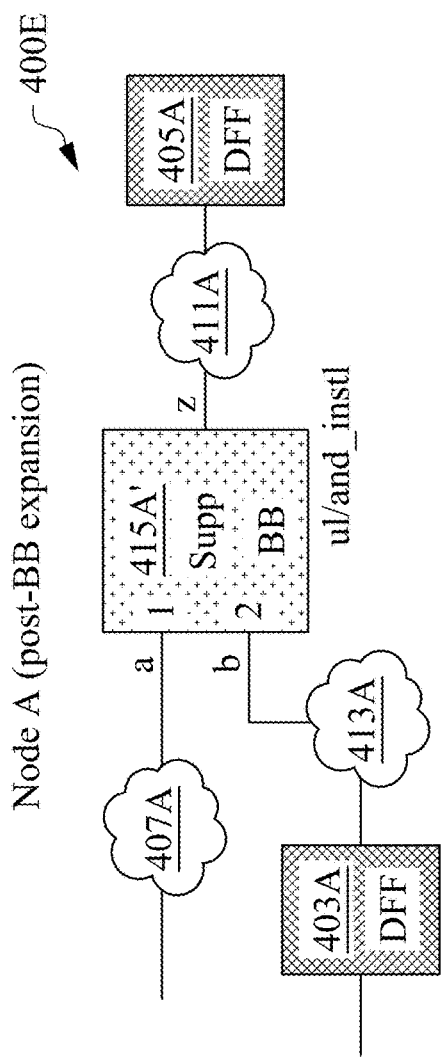
Figure 4F:
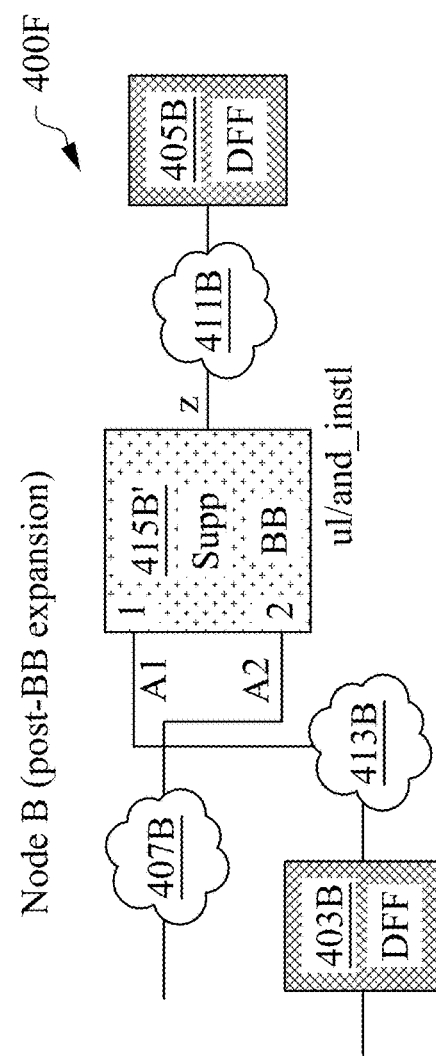

FIGS. 4E and 4F are logic block diagrams after black box addition of corresponding logic cones 400E and 400F under corresponding first and second SPT nodes, in accordance with at least one embodiment of the present disclosure.

Figure 4G:
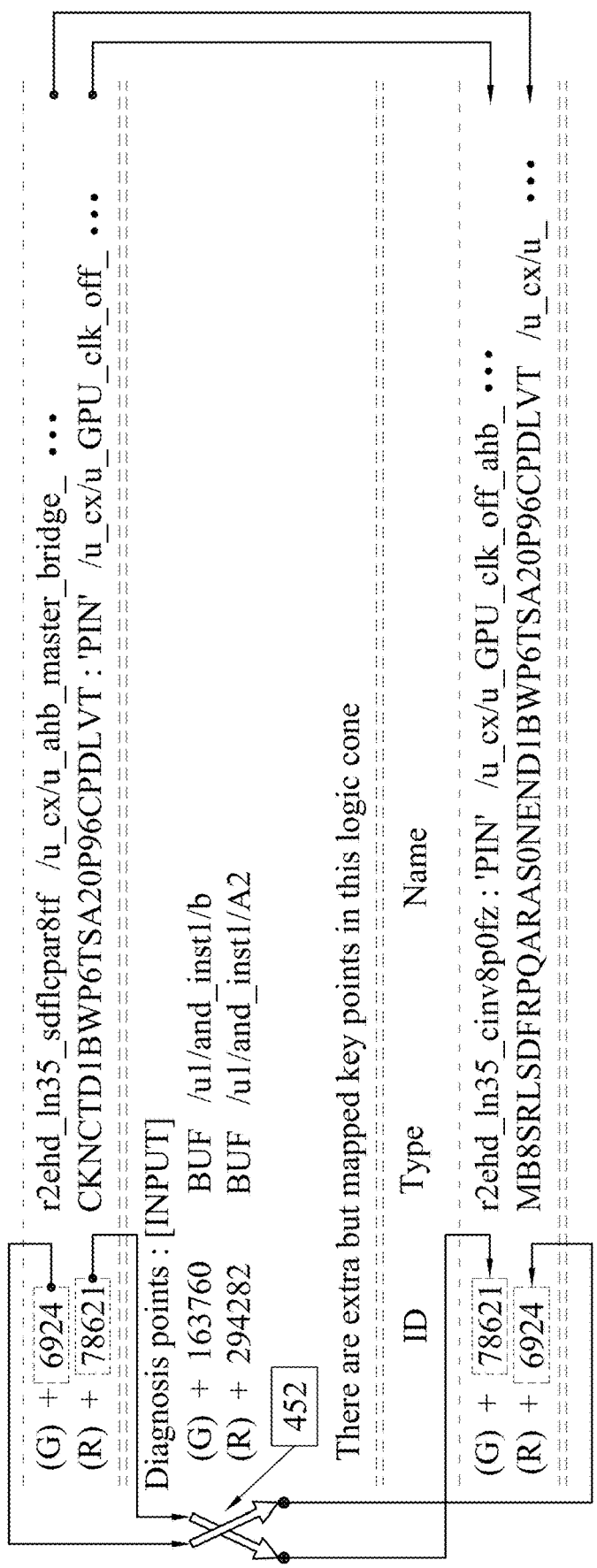
FIG. 4G is an example of a listing of results of a pin equivalence check, in accordance with at least one embodiment of the present disclosure.

FIG. 4G is an example of a listing 460 of results of a pin equivalence check, in accordance with at least one embodiment of the present disclosure.

Returning to FIG. 4A, method 440 includes blocks 442-450. At block 442, a logic cone in the predecessor netlist under the first SPT node (Node A) and a corresponding logic cone in the $i^{th}$ candidate for the revised netlist are identified. From block 442, flow proceeds to block 444.

At block 444, a timing constraint list corresponding to candidate netlist under Node B is checked for addition candidates. In some embodiments, each instance of combinational logic in the timing constraint list represents an addition candidate. From block 444, flow proceeds to block 446.

In some embodiments, combinational logic (sometimes also referred to as time-independent logic) is a type of digital logic for which the output depends on the present input(s) and does not depend on the history of the input(s). Examples of combinational logic include a single combinational gate or a combination of single combinational gates. An example of single combinational gate is a NAND gate. An example of a combination of single combinational gates is an AND connected in series with an inverter so as to represent an equivalent of a NAND gate. In some embodiments, sequential logic is a type of digital logic for which the output depends not only on the present input(s) but also on the history of the input(s). An example of sequential logic is a D flip-flop (DFF). In other words, a sequential gate has memory while a combinational gate does not. According to another approach, a sequential gate was regarded as a source of comparison points.

Returning to the examples by which are illustrated aspects of method 440: FIG. 4B shows a first portion (for simplicity) of an example predecessor netlist before black box (BB) addition (pre-BB addition), the pre-BB-addition first portion being represented as logic cone 400B; and FIG. 4C shows a second portion (for simplicity) of an example $i^{th}$ candidate for the revised netlist before BB addition (pre-BB addition), the pre-BB-addition second portion being represented as logic cone 400C.

Logic cone 400B includes: instances of combinational logic represented as glass boxes 407A, 411A and 413A; and instances of sequential logic, e.g., D flip-flop (DFF) 403A and DFF 405A. Inputs of sequential logic, e.g., D flip-flop (DFF) 403A and DFF 405A are regarded as representing corresponding comparison points. Logic cone 400B further includes an instance of combinational logic which is shown, for example, as an AND gate 415A. Here, combinational logic 415A (AND gate 415A) has not been shown as a glass box for purposes of explaining how the netlists are expanded (see discussion of block 446).

Logic cone 400C includes: instances of combinational logic represented as glass boxes 407B, 411B and 413B; and instances of sequential logic, namely DFF 403B and DFF 405B. Here, combinational logic 415B (AND gate 415B) has not been shown as a glass box for purposes of explaining how the netlists are expanded (see discussion of block 446).

At block 446, each instance of combinational logic identified in the timing constraint list is converted from being represented in the netlist as a glass box to being represented in the netlist as a corresponding black box. Each newly-converted black box represents an additional comparison point, thereby 'expanding' the netlist by having added one or more comparison points to the netlist. In some embodiments, relative to the number of comparison points included in the netlist before 'expansion,' the netlist is expanded in terms of having increased a total number of comparison point by having added the newly-converted black boxes. In some embodiments, such a conversion from a glass box to a corresponding supplemental black box includes deleting any definitions associated with the given instance of combinational logic.

As part of the conversion in block 446, for each to-be-converted glass box in the logic cone under the first SPT node (Node A) and the corresponding to-be-converted glass box in the logic cone under the second SPT node (Node B), rules are provided by which inputs of the former are mapped on a one-to-one (1:1) basis to corresponding inputs of the latter. In some embodiments, such mapping is performed on a basis other than a one-to-one (1:1) basis. Table 421 in FIG. 4D provides a simple example of a table of rules for mapping inputs of a given to-be-converted glass box in the logic cone under the first SPT node (Node A), e.g., logic cone 400B, to corresponding inputs of a given to-be-converted glass box in the logic cone under the second SPT node (Node B), e.g., logic cone 400C. In the context of the example of FIG. 4D, Table 421 includes: a rule which maps input 'a' on terminal #1 of AND gate 415A to input 'A2' on terminal #1 of AND gate 415B; a rule which maps input 'b' on terminal #2 of AND gate 415A to input 'A1' on terminal #2 of AND gate 415B; and a rule which maps output 'z' on terminal #3 of AND gate 415A to input 'Z' on terminal #3 of AND gate 415B.

Returning again to the examples by which are illustrated aspects of method 440: in the context of the example of the first portion (for simplicity) of the predecessor netlist (begun in FIG. 4B as logic cone 400B), FIG. 4E shows the example of the first portion of the predecessor netlist after BB addition (post-BB addition) as logic cone 400E; and in the context of the example of the second portion (for simplicity) of the of the example $i^{th}$ candidate for the revised netlist (begun in FIG. 4C as logic cone 400C), FIG. 4F shows the example of the second portion of the $i^{th}$ candidate after BB addition (post-BB addition) as logic cone 400F.

Logic cone 400E corresponds to logic 400A albeit with an exception. The exception is a manifestation of the BB addition. In logic cone 400E, AND gate 415A of logic cone 400B has been replaced in logic cone 400E with supplemental black box 415A'. Logic cone 400F corresponds to logic 400C albeit with an exception. The exception is a manifestation of the BB addition. In logic cone 400F, AND gate 415B of logic cone 400C has been replaced in logic cone 400F with supplemental black box 415B'.

From block 446, flow proceeds to block 448. At block 448, inputs and outputs of corresponding comparison points, namely corresponding sequential logic and black boxes, are compared on a one-to-one (1:1) basis in order to identify instances of the not equivalent point (NEP) type of migration error. In some embodiments, such mapping is performed on a basis other than a one-to-one (1:1) basis. From block 448, flow proceeds to block 450. At block 450, the $i^{th}$ candidate for the revised netlist is revised in order to reduce the NEP error(s).

In the context of the example of FIG. 4E, inputs 'a' and 'b' for supplemental black box 415A' are shown as being connected to corresponding terminals #1 and #2 of supplemental black box 415A'. According to the rules in example Table 421, however, input 'A1' for supplemental black box 415B' should be connected to terminal #2 of supplemental black box 415B', and input 'A2' for supplemental black box 415B' should be connected to terminal #1 of supplemental black box 415B'. However, in the context of the example of FIG. 4F, there is a 'cross connection' of inputs in that inputs 'A1' and 'A2' for supplemental black box 415B' are shown as being connected to corresponding terminals #1 and #2 of supplemental black box 415B'. Hence, in the example of FIGS. 4D-4F, the cross connection of the inputs for supplemental black box 415B' has given rise to a NEP error at block 448. Again, FIG. 4G is an example of a listing 460 of results of a pin equivalence check, and more particularly example results of the comparison of block 448. In the example of FIG. 4G, an example of a 'cross connection' of inputs is indicate by reference number 452.

Figure 5:
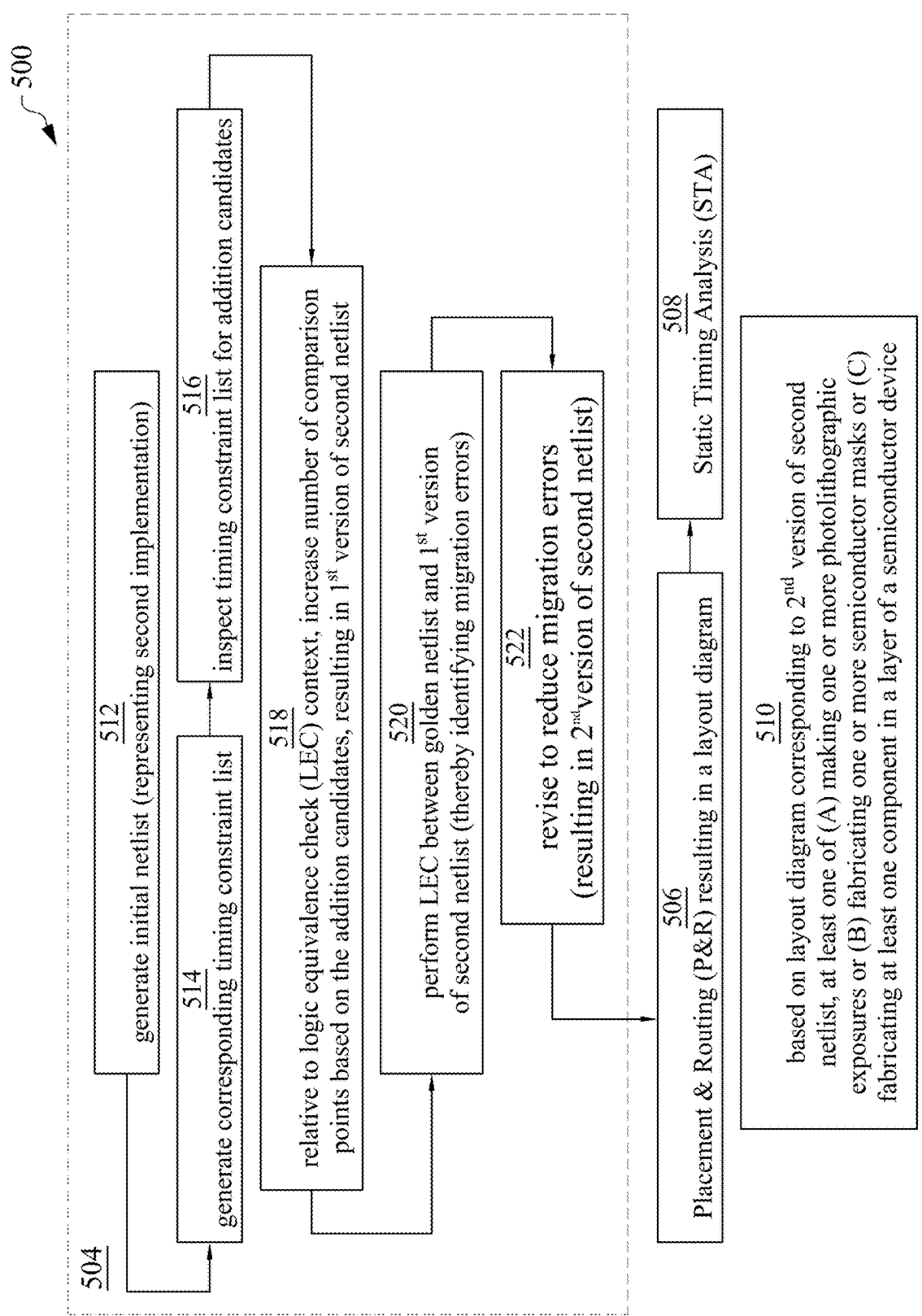
FIG. 5 is a flowchart of a method, in accordance with some embodiments.

FIG. 5 is a flowchart of a method 500, in accordance with some embodiments.

Among other things, method 500 includes a block 504 of migrating from a first implementation of a circuit design to a second implementation of the circuit design, in accordance with some embodiments. In addition to block 504, method 500 includes blocks 506-510.

In some embodiments, method 500 is a method of migrating from a first netlist to a second netlist. The first netlist represents a first implementation of a circuit design under a first semiconductor process technology (SPT) node (Node A). An example of the first netlist is the predecessor netlist (netlist_Node_A) of FIG. 2. The second netlist represents a second implementation of the circuit design under a second SPT node (Node B). An example of the second netlist is the second netlist (netlist_Node_B) of FIG. 2.

Method 500 is implementable, for example, using EDA system 600 (see FIG. 6, discussed below), in accordance with some embodiments. In some embodiments, at least the second netlist is stored on a non-transitory computer-readable medium.

In FIG. 5, block 504 includes blocks 512-522. At block 512, an initial netlist is generated, the initial netlist representing the second implementation. From block 512, flow proceeds to block 514. At block 514, a timing constraint list corresponding to the initial netlist is generated. An example of the initial timing constraint list corresponding to the initial netlist is the $i^{th}$ timing candidate (timing_candidate(i)) for the timing constraint list in FIG. 2, where i=0, namely the $0^{th}$ timing_candidate, timing_candidate(0). From block 514, flow proceeds to block 516.

At block 516, the $i^{th}$ timing candidate (timing_candidate (i)) is inspected for addition candidates. In some embodiments, each instance of combinational logic in the $i^{th}$ timing candidate represents an addition candidate. From block 516, flow proceeds to block 518.

At block 518, relative to a context of a logic equivalence check (LEC), a number of comparison points in the initial netlist is increased based on the addition candidates, resulting in a first version of the second netlist. An example of the first version of the second netlist is $i^{th}$ netlist candidate (netlist_candidate(i)) in FIG. 2, where i=0, namely the $0^{th}$ netlist candidate, netlist_candidate(0). In some embodiments, the number of comparison points in the initial netlist is increased by converting each instance of combinational logic identified in the $i^{th}$ timing candidate from having been represented in the initial netlist as a glass box to being represented as a corresponding supplemental black box in the $i^{th}$ netlist candidate. In some embodiments, such a conversion from a glass box to a corresponding supplemental black box includes deleting any definitions associated with the given instance of combinational logic. From block 518, flow proceeds to block 520.

At block 520 a LEC is performed between the first netlist and the first version of the second netlist, thereby identifying migration errors. An example of the first netlist is the predecessor netlist (netlist_Node_A) under the first SPT node (Node A) of FIG. 2. Examples of migration errors identified by the LEC check of block 522 include at least one of a not-matched pin (NMP) error (see FIG. 3) or a non-equivalent pin (NEP) error (see FIGS. 4A-4E). From block 520, flow proceeds to block 522.

At block 522, the first version of the second netlist is revised to reduce the migration errors, thereby resulting in a second version of the second netlist. An example of the second version is found in FIG. 2 as the revised netlist (netlist_Node_B). In FIG. 2, the $i^{th}$ netlist candidate (netlist_candidate(i)) provided from block 204 to block 206 is deemed to be the revised netlist (netlist_Node_B). In some embodiments, at block 522, the initial netlist is overwritten with the second version of the second netlist, and flow loops back (not shown) to block 514. An example of such looping back is the flow proceeding from block 224 to block 220 in FIG. 2. From block 522, flow proceeds out of block 504 and onto block 506.

At block 506, in view of the timing constraint list, the second version of the first netlist is subjected to placement & routing (P&R), resulting in a layout diagram. From block 506, flow proceeds to block 508. At block 508, in view of the timing constrain list, the layout diagram is subjected to static timing analysis (STA). In some embodiments, if one or more timing errors are identified in block 508, the flow loops back (not shown) to block 506, where the layout diagram is revised in order to reduce the timing error(s). From block 508, flow proceeds to block 510.

At block 510, based on the layout diagram corresponding to the second netlist, at least one of (A) one or more semiconductor masks or (B) at least one component in a layer of a semiconductor device is fabricated. See discussion below of FIG. 10. In some embodiments, the fabricating further includes performing one or more lithographic exposures based on the layout diagram corresponding to the second netlist.

Figure 6:
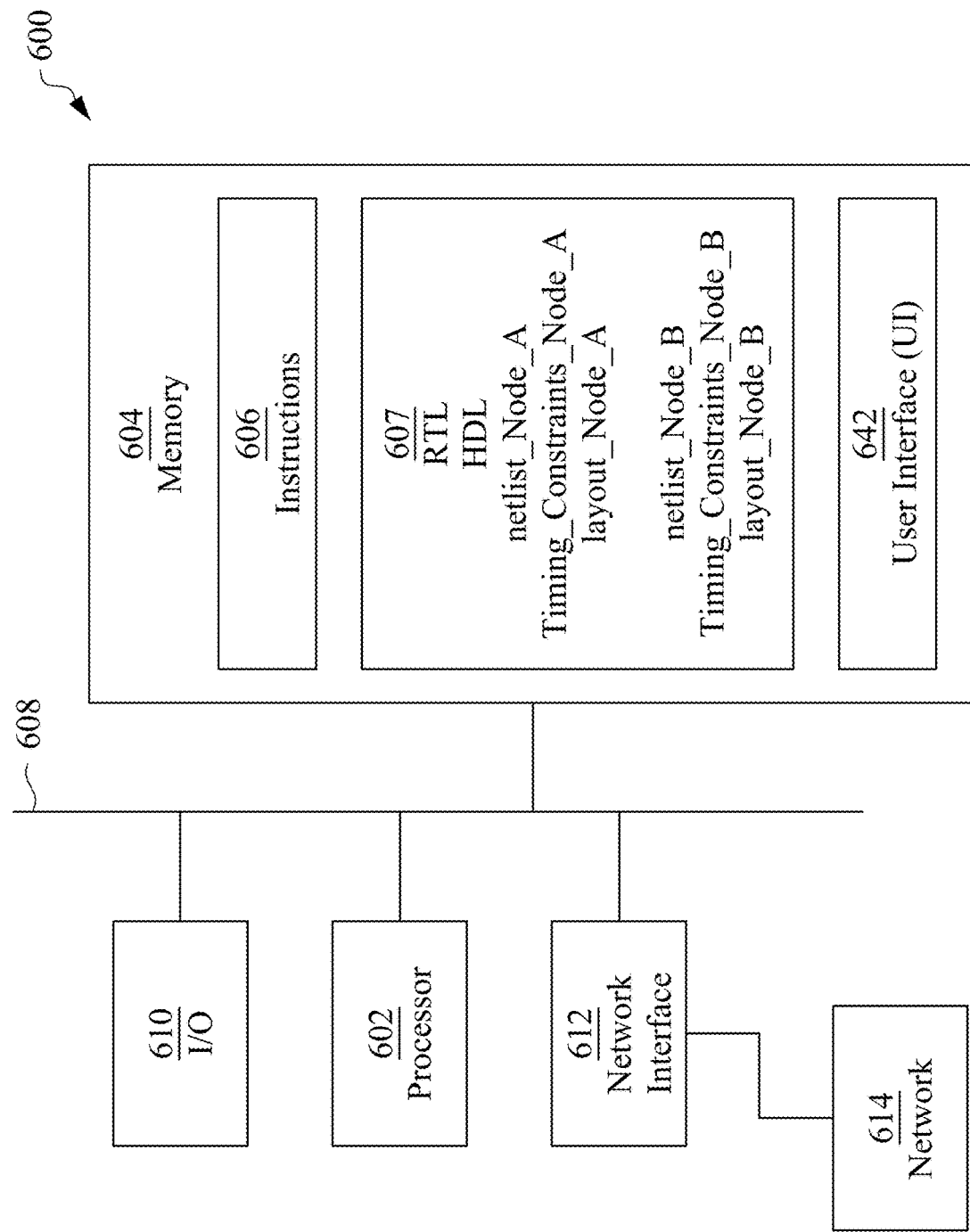
FIG. 6 is a block diagram of an electronic design automation (EDA) system in accordance with some embodiments.

FIG. 6 is a block diagram of an electronic design automation (EDA) system 600 in accordance with some embodiments.

In some embodiments, EDA system 600 includes an APR system. Methods described herein of designing layout diagrams of a wire-routing arrangement, in accordance with one or more embodiments, are implementable, for example, using EDA system 600, in accordance with some embodiments.

In some embodiments, EDA system 600 is a general purpose computing device including a hardware processor 602 and a non-transitory, computer-readable storage medium 604. Storage medium 604, amongst other things, is encoded with, i.e., stores, computer program code 606, i.e., a set of executable instructions. Execution of instructions 606 by hardware processor 602 represents (at least in part) an EDA tool which implements a portion or all of, e.g., the methods described herein in accordance with one or more (hereinafter, the noted processes and/or methods). Storage medium further includes, for a given circuit design, related files such as an RTL abstraction, an HDL representation, netlist_Node_A, Timing_Node_A, layout_Node_A, netlist_Node_B, Timing_Node_B, layout_Node_B, or the like.

Processor 602 is electrically coupled to computer-readable storage medium 604 via a bus 608. Processor 602 is also electrically coupled to an I/O interface 610 by bus 608. A network interface 612 is also electrically connected to processor 602 via bus 608. Network interface 612 is connected to a network 614, so that processor 602 and computer-readable storage medium 604 are capable of connecting to external elements via network 614. Processor 602 is configured to execute computer program code 606 encoded in computer-readable storage medium 604 in order to cause system 600 to be usable for performing a portion or all of the noted processes and/or methods. In one or more embodiments, processor 602 is a central processing unit (CPU), a multi-processor, a distributed processing system, an application specific integrated circuit (ASIC), and/or a suitable processing unit.

In one or more embodiments, computer-readable storage medium 604 is an electronic, magnetic, optical, electromagnetic, infrared, and/or a semiconductor system (or apparatus or device). For example, computer-readable storage medium 604 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 604 includes a compact disk-read only memory (CD-ROM), a compact disk-read/write (CD-R/W), and/or a digital video disc (DVD).

In one or more embodiments, storage medium 604 stores computer program code 606 configured to cause system 600 (where such execution represents (at least in part) the EDA tool) to be usable for performing a portion or all of the noted processes and/or methods. In one or more embodiments, storage medium 604 also stores information which facilitates performing a portion or all of the noted processes and/or methods. In one or more embodiments, storage medium 604 stores library 607 of standard cells including such standard cells as disclosed herein.

EDA system 600 includes I/O interface 610. I/O interface 610 is coupled to external circuitry. In one or more embodiments, I/O interface 610 includes a keyboard, keypad, mouse, trackball, trackpad, touchscreen, and/or cursor direction keys for communicating information and commands to processor 602.

EDA system 600 also includes network interface 612 coupled to processor 602. Network interface 612 allows system 600 to communicate with network 614, to which one or more other computer systems are connected. Network interface 612 includes wireless network interfaces such as BLUETOOTH, WIFI, WIMAX, GPRS, or WCDMA; or wired network interfaces such as ETHERNET, USB, or IEEE-1464. In one or more embodiments, a portion or all of noted processes and/or methods, is implemented in two or more systems 600.

System 600 is configured to receive information through I/O interface 610. The information received through I/O interface 610 includes one or more of instructions, data, design rules, libraries of standard cells, and/or other parameters for processing by processor 602. The information is transferred to processor 602 via bus 608. EDA system 600 is configured to receive information related to a UI through I/O interface 610. The information is stored in computer-readable medium 604 as user interface (UI) 642.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by EDA system 600. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 7:
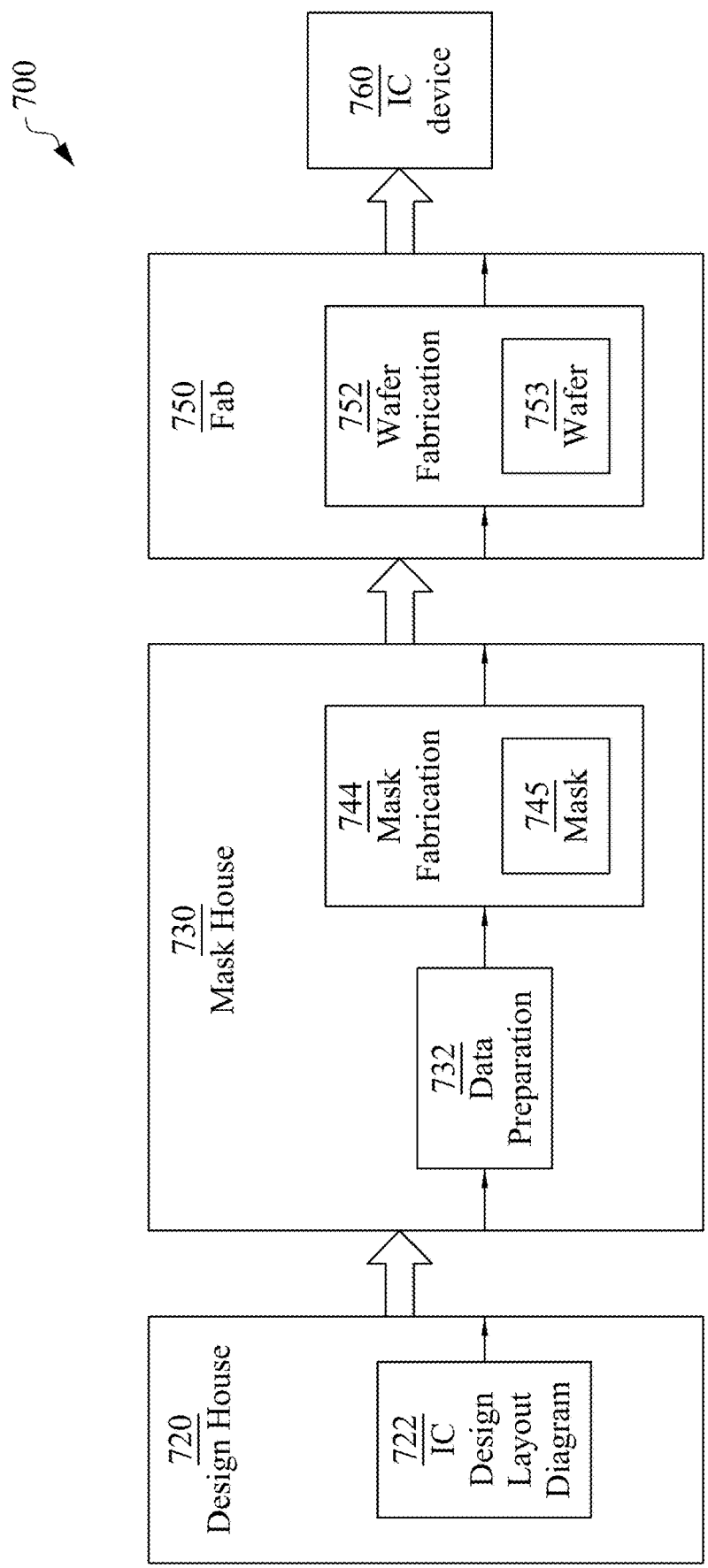
FIG. 7 is a block diagram of an integrated circuit (IC) manufacturing system, and an IC manufacturing flow associated therewith, in accordance with some embodiments.

FIG. 7 is a block diagram of an integrated circuit (IC) manufacturing system 700, and an IC manufacturing flow associated therewith, in accordance with some embodiments.

In some embodiments, based on a layout diagram, at least one of (A) one or more semiconductor masks or (B) at least one component in a layer of a semiconductor device is fabricated using manufacturing system 700.

In FIG. 7, IC manufacturing system 700 includes entities, such as a design house 720, a mask house 730, and an IC manufacturer/fabricator ("fab") 750, that interact with one another in the design, development, and manufacturing cycles and/or services related to manufacturing an IC device 760. The entities in system 700 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 720, mask house 730, and IC fab 750 is owned by a single larger company. In some embodiments, two or more of design house 720, mask house 730, and IC fab 750 coexist in a common facility and use common resources.

Design house (or design team) 720 generates an IC design layout diagram 722. IC design layout diagram 722 includes various geometrical patterns designed for an IC device 760. The geometrical patterns correspond to patterns of metal, oxide, or semiconductor layers that make up the various components of IC device 760 to be fabricated. The various layers combine to form various IC features. For example, a portion of IC design layout diagram 722 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 720 implements a proper design procedure to form IC design layout diagram 722. The design procedure includes one or more of logic design, physical design or place and route. IC design layout diagram 722 is presented in one or more data files having information of the geometrical patterns. For example, IC design layout diagram 722 can be expressed in a GDSII file format or DFII file format.

Mask house 730 includes data preparation 732 and mask fabrication 744. Mask house 730 uses IC design layout diagram 722 to manufacture one or more masks 745 to be used for fabricating the various layers of IC device 760 according to IC design layout diagram 722. Mask house 730 performs mask data preparation 732, where IC design layout diagram 722 is translated into a representative data file ("RDF"). Mask data preparation 732 provides the RDF to mask fabrication 744. Mask fabrication 744 includes a mask writer. A mask writer converts the RDF to an image on a substrate, such as a mask (reticle) 745 or a semiconductor wafer 754. The design layout diagram 722 is manipulated by mask data preparation 732 to comply with particular characteristics of the mask writer and/or requirements of IC fab 750. In FIG. 7, mask data preparation 732 and mask fabrication 744 are illustrated as separate elements. In some embodiments, mask data preparation 732 and mask fabrication 744 can be collectively referred to as mask data preparation.

In some embodiments, mask data preparation 732 includes optical proximity correction (OPC) which uses lithography enhancement techniques to compensate for image errors, such as those that can arise from diffraction, interference, other process effects and the like. OPC adjusts IC design layout diagram 722. In some embodiments, mask data preparation 732 includes further resolution enhancement techniques (RET), such as off-axis illumination, subresolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 732 includes a mask rule checker (MRC) that checks the IC design layout diagram 722 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 722 to compensate for limitations during mask fabrication 744, which may undo part of the modifications performed by OPC in order to meet mask creation rules.

In some embodiments, mask data preparation 732 includes lithography process checking (LPC) that simulates processing that will be implemented by IC fab 750 to fabricate IC device 760. LPC simulates this processing based on IC design layout diagram 722 to create a simulated manufactured device, such as IC device 760. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus ("DOF"), mask error enhancement factor ("MEEF"), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 722.

It should be understood that the above description of mask data preparation 732 has been simplified for the purposes of clarity. In some embodiments, data preparation 732 includes additional features such as a logic operation (LOP) to modify the IC design layout diagram 722 according to manufacturing rules. Additionally, the processes applied to IC design layout diagram 722 during data preparation 732 may be executed in a variety of different orders.

After mask data preparation 732 and during mask fabrication 744, a mask 745 or a group of masks 745 are fabricated based on the modified IC design layout diagram 722. In some embodiments, mask fabrication 744 includes performing one or more lithographic exposures based on IC design layout diagram 722. In some embodiments, an electron-beam (e-beam) or a mechanism of multiple e-beams is used to form a pattern on a mask (photomask or reticle) 745 based on the modified IC design layout diagram 722. Mask 745 can be formed in various technologies. In some embodiments, mask 745 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of mask 745 includes a transparent substrate (e.g., fused quartz) and an opaque material (e.g., chromium) coated in the opaque regions of the binary mask. In another example, mask 745 is formed using a phase shift technology. In a phase shift mask (PSM) version of mask 745, various features in the pattern formed on the phase shift mask are configured to have proper phase difference to enhance the resolution and imaging quality. In various examples, the phase shift mask can be attenuated PSM or alternating PSM.

The mask(s) generated by mask fabrication 744 is used in a variety of processes. For example, such a mask(s) is used in an ion implantation process to form various doped regions in semiconductor wafer 754, in an etching process to form various etching regions in semiconductor wafer 754, and/or in other suitable processes.

IC fab 750 includes wafer fabrication 752. IC fab 750 is an IC fabrication business that includes one or more manufacturing facilities for the fabrication of a variety of different IC products. In some embodiments, IC Fab 750 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 750 uses mask(s) 745 fabricated by mask house 730 to fabricate IC device 760. Thus, IC fab 750 at least indirectly uses IC design layout diagram 722 to fabricate IC device 760. In some embodiments, semiconductor wafer 754 is fabricated by IC fab 750 using mask(s) 745 to form IC device 760. In some embodiments, the IC fabrication includes performing one or more lithographic exposures based at least indirectly on IC design layout diagram 722. Semiconductor wafer 754 includes a silicon substrate or other proper substrate having material layers formed thereon. Semiconductor wafer 754 further includes one or more of various doped regions, dielectric features, multi-level interconnects, and the like (formed at subsequent manufacturing steps).

Details regarding an integrated circuit (IC) manufacturing system (e.g., system 700 of FIG. 7), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

A method of manufacturing a semiconductor device, the method including reducing errors in a migration of a first netlist to a second netlist, the first netlist corresponding to a first semiconductor process technology (SPT), the second first netlist corresponding to a second SPT, the first and second netlists each representing a same circuit design, at least the second netlist being stored on a non-transitory computer-readable medium, the reducing errors including: inspecting a timing constraint list corresponding to the second netlist for addition candidates; generating a first version of the second netlist having a first number of comparison points relative to a logic equivalence check (LEC) context, the first number of comparison points being based on the addition candidates; performing a LEC between the first netlist and the first version of the second netlist, thereby identifying migration errors; and revising the second netlist to reduce the migration errors, thereby resulting in a second version of the second netlist. In some embodiments, the inspecting the timing constraint list includes identifying combinational circuits in the timing constraint list correspondingly as the addition candidates, and wherein generating the first version of the second netlist includes converting the identified combinational circuits into a supplemental black box thereby resulting in the first version of the second netlist. In some embodiments, the converting includes: deleting definitions associated with the identified combinational circuits. In some embodiments, the inspecting the timing constraint list includes: identifying combinational circuits in the timing constraint list correspondingly as the addition candidates; and generating the first version of the second netlist includes: mapping names of pins of identified elements in the first version of the second netlist with names of corresponding pins of corresponding elements in the first netlist. In some embodiments, the mapping names of pins includes: generating one or more tables which associate, on a one-to-one (1:1) basis, the names of pins of the identified elements in the first version of the second netlist with the names of the corresponding pins of the corresponding elements in the first netlist. In some embodiments, the performing LEC is executed before performing placement and routing (P&R) of a layout diagram corresponding to the second netlist. In some embodiments, the performing LEC is executed before performing a static timing analysis of a layout diagram corresponding to the second netlist. In some embodiments, types of the migration errors include at least one of: a not-matched pin (NMP) error; or a non-equivalent pin (NEP) error; and the performing LEC includes at least one of: identifying on or more instances of the NMP error; or identifying on or more instances of the NEP error. The method of claim, further including: based on a layout diagram corresponding to the second version of the second netlist, at least one of: making one or more photolithographic exposures; fabricating one or more photolithographic masks; or fabricating at least one component in a layer of a semiconductor device.

In some embodiments, a system for reducing errors in a migration from a first netlist to a second netlist, the first and second netlists representing a same circuit design under corresponding first and second semiconductor process technology (SPT) nodes, at least the second netlist being stored on a non-transitory computer-readable medium, the system including: at least one processor; and at least one memory including computer program code for one or more programs; wherein the at least one memory, the computer program code and the at least one processor are configured to cause the system to execute: inspecting a timing constraint list corresponding to the second netlist for addition candidates; generating a first version of the second netlist having a first number of comparison points relative to a logic equivalence check (LEC) context, the first number of comparison points being based on the addition candidates; performing a LEC between the first netlist and the first version of the second netlist, thereby identifying migration errors; and revising the second netlist to reduce the migration errors, thereby resulting in a second version of the second netlist. In some embodiments, the inspecting the timing constraint list includes: identifying combinational circuits in the timing constraint list correspondingly as the addition candidates, and wherein generating the first version of the second netlist includes converting the identified combinational circuits into a supplemental black box thereby resulting in the first version of the second netlist. In some embodiments, the converting includes: deleting definitions associated with the identified combinational circuits. In some embodiments, the inspecting the timing constraint list includes: identifying combinational circuits in the timing constraint list correspondingly as the addition candidates; and generating the first version of the second netlist includes: mapping names of pins of identified elements in the first version of the second netlist with names of corresponding pins of corresponding elements in the first netlist. In some embodiments, at least one of the following is true: the performing LEC is done before performing placement and routing (P&R) of a layout diagram corresponding to the second netlist; or the performing LEC is done before performing a static timing analysis of a layout diagram corresponding to the second netlist. In some embodiments, types of the migration errors include at least one of: a not-matched pin (NMP) error; or a non-equivalent pin (NEP) error; and the performing LEC includes at least one of: identifying on or more instances of the NMP error; or identifying on or more instances of the NEP error. In some embodiments, the system further includes at least one of: a masking facility configured to fabricate one or more semiconductor masks based on based on a layout diagram corresponding to the second version of the second netlist; or a fabricating facility configured to fabricate at least one component in a layer of a semiconductor device based on a layout diagram corresponding to the second version of the second netlist.

In some embodiments, a method of manufacturing a semiconductor device, the method including: migrating from a first netlist to a second netlist, the first and second netlists representing the same circuit design under corresponding first and second semiconductor process technology (SPT) nodes, at least the second netlist being stored on a non-transitory computer-readable medium, the migrating including: inspecting a timing constraint list corresponding to the second netlist for addition candidates; generating a first version of the second netlist having a first number of comparison points relative to a logic equivalence check (LEC) context, the first number of comparison points being based on the addition candidates; performing a LEC between the first netlist and the first version of the second netlist, thereby identifying migration errors; and revising the second netlist to reduce the migration errors, thereby resulting in a second version of the second netlist. In some embodiments, the inspecting the timing constraint list includes identifying combinational circuits in the timing constraint list correspondingly as the addition candidates, and wherein generating the first version of the second netlist includes converting the identified combinational circuits into a supplemental black box thereby resulting in the first version of the second netlist. In some embodiments, at least one of the following is true: the performing LEC is done before performing placement and routing (P&R) of a layout diagram corresponding to the second netlist; or the performing LEC is done before performing a static timing analysis of a layout diagram corresponding to the second netlist; types of the migration errors include at least one of: a not-matched pin (NMP) error; or a non-equivalent pin (NEP) error; and the performing LEC includes at least one of: identifying on or more instances of the NMP error; or identifying on or more instances of the NEP error. In some embodiments, the method further includes: based on a layout diagram corresponding to the second version of the second netlist, at least one of: making one or more photolithographic exposures; fabricating one or more photolithographic masks; or fabricating at least one component in a layer of a semiconductor device.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A method of manufacturing a semiconductor device, the method comprising:
reducing errors in a migration of a first netlist to a second netlist, the first netlist corresponding to a first semiconductor process technology (SPT), the second netlist corresponding to a second SPT, the first and second netlists each representing a same circuit design, at least the second netlist being stored on a non-transitory computer-readable medium, the reducing errors including:
inspecting a timing constraint list corresponding to the second netlist for addition candidates;
generating a first version of the second netlist having a first number of comparison points which are to be used in a logic equivalence check process (LEC), the first number of comparison points being based on the addition candidates;
performing the LEC between the first netlist and the first version of the second netlist, thereby identifying migration errors; and
revising the second netlist to reduce the migration errors, thereby resulting in a second version of the second netlist.

2. The method of claim 1, wherein:
the inspecting the timing constraint list includes:
identifying combinational circuits in the timing constraint list correspondingly as the addition candidates; and
the generating the first version of the second netlist includes:
converting each identified combinational circuit into a supplemental black box thereby resulting in the first version of the second netlist.

3. The method of claim 2, wherein the converting includes:
deleting definitions associated with the identified combinational circuits.

4. The method of claim 1, wherein:
the inspecting the timing constraint list includes:
identifying combinational circuits in the timing constraint list correspondingly as the addition candidates; and
the generating the first version of the second netlist includes:
mapping names of pins of identified elements in the first version of the second netlist with names of corresponding pins of corresponding elements in the first netlist.

5. The method of claim 4, wherein:
the mapping the names of pins includes:
generating one or more tables which associate, on a one-to-one (1:1) basis, the names of pins of the identified elements in the first version of the second netlist with the names of the corresponding pins of the corresponding elements in the first netlist.

6. The method of claim 1, wherein:
the performing the LEC is executed before performing placement and routing (P&R) of a layout diagram corresponding to the second netlist.

7. The method of claim 1, wherein:
the performing the LEC is executed before performing a static timing analysis of a layout diagram corresponding to the second netlist.

8. The method of claim 1, wherein:
types of the migration errors include at least one of:
a not-matched pin (NMP) error; or
a non-equivalent pin (NEP) error; and
the performing LEC includes at least one of:
identifying one or more instances of the NMP error; or
identifying one or more instances of the NEP error.

9. The method of claim 1, further comprising:
based on a layout diagram corresponding to the second version of the second netlist, at least one of:
making one or more photolithographic exposures;
fabricating one or more photolithographic masks; or
fabricating at least one component in a layer of the semiconductor device.

10. A system for reducing errors in a migration from a first netlist to a second netlist, the first and second netlists representing a same circuit design under corresponding first and second semiconductor process technology (SPT) nodes, at least the second netlist being stored on a non-transitory computer-readable medium, the system comprising:
at least one processor; and
at least one memory including computer program code for one or more programs;
wherein the at least one memory, the computer program code and the at least one processor are configured to cause the system to execute:
inspecting a timing constraint list corresponding to the second netlist for addition candidates;
generating a first version of the second netlist having a first number of comparison points which are to be used in a logic equivalence check process (LEC), the first number of comparison points being based on the addition candidates;
performing the LEC between the first netlist and the first version of the second netlist, thereby identifying migration errors; and
revising the second netlist to reduce the migration errors, thereby resulting in a second version of the second netlist.

11. The system of claim 10, wherein:
the inspecting the timing constraint list includes:
identifying combinational circuits in the timing constraint list correspondingly as the addition candidates and
the generating the first version of the second netlist includes:
converting the identified combinational circuits into a supplemental black box thereby resulting in the first version of the second netlist.

12. The system of claim 11, wherein the converting includes:
deleting definitions associated with the identified combinational circuits.

13. The system of claim 10, wherein the inspecting the timing constraint list includes:
identifying combinational circuits in the timing constraint list correspondingly as the addition candidates; and
the generating a first version of the second netlist includes:
mapping names of pins of identified elements in the first version of the second netlist with names of corresponding pins of corresponding elements in the first netlist.

14. The system of claim 10, wherein at least one of the following is true:
the performing the LEC is done before performing placement and routing (P&R) of a layout diagram corresponding to the second netlist; or the performing the LEC is done before performing a static timing analysis of the layout diagram corresponding to the second netlist.

15. The system of claim 10, wherein:
types of the migration errors include at least one of:
  a not-matched pin (NMP) error; or
  a non-equivalent pin (NEP) error; and
the performing LEC includes at least one of:
  identifying one or more instances of the NMP error; or
  identifying one or more instances of the NEP error.

16. The system of claim 10, further comprising at least one of:
  a masking facility configured to fabricate one or more semiconductor masks based on based on a layout diagram corresponding to the second version of the second netlist; or
  a fabricating facility configured to fabricate at least one component in a layer of a semiconductor device based on the layout diagram corresponding to the second version of the second netlist.

17. A method of migrating from a first netlist to a second netlist, the first and second netlists representing a same circuit design under corresponding first and second semiconductor process technology (SPT) nodes, at least the second netlist being stored on a non-transitory computer-readable medium, the migrating including:
  inspecting a timing constraint list corresponding to the second netlist to identify combinational circuits as addition candidates;
  converting selected glass boxes of the identified combinational circuits into supplemental black boxes to generate a first version of the second netlist having a first number of comparison points which are to be used in a logic equivalence check process (LEC), the first number of comparison points being based on the addition candidates;
  performing the LEC between the first netlist and the first version of the second netlist, thereby identifying migration errors; and
  revising the second netlist to reduce the migration errors, thereby resulting in a second version of the second netlist.

18. The method of claim 17, wherein the converting selected glass boxes includes:
  deleting any definitions associated with a given selected glass box of one of the identified combinational circuits.

19. The method of claim 17, wherein:
at least one of the following is true:
  the performing LEC is done before performing placement and routing (P&R) of a layout diagram corresponding to the second netlist; or
  the performing LEC is done before performing a static timing analysis of the layout diagram corresponding to the second netlist;
types of the migration errors include at least one of:
  a not-matched pin (NMP) error; or
  a non-equivalent pin (NEP) error; and
the performing LEC includes at least one of:
  identifying one or more instances of the NMP error; or
  identifying one or more instances of the NEP error.

20. The method of claim 17, further comprising:
based on a layout diagram corresponding to the second version of the second netlist, at least one of:
  making one or more photolithographic exposures;
  fabricating one or more photolithographic masks; or
  fabricating at least one component in a layer of a semiconductor device.

* * * * *